(12) United States Patent
Johnson et al.

(10) Patent No.: US 7,584,677 B1
(45) Date of Patent: Sep. 8, 2009

(54) TRAILER JACK LOCK

(76) Inventors: Glenn Johnson, 36 Village Rd., Beach Lake, PA (US) 18405; John Pallay, 97 Woodledge Village, Hawley, PA (US) 18428; Kevin Mak, 136 Crestwood Dr., Warren, NJ (US) 07059

( * ) Notice: Subject to any disclaimer, the term of this patent is extended or adjusted under 35 U.S.C. 154(b) by 199 days.

(21) Appl. No.: 11/523,912

(22) Filed: Sep. 21, 2006

(51) Int. Cl.
*F16H 3/06* (2006.01)
(52) U.S. Cl. .................. 74/89.23; 254/424; 70/218
(58) Field of Classification Search ............... 74/89.23; 254/418, 419, 420, 424; 280/763.1, 764.1, 280/765.1, 766.1; 180/287; 70/237, 258, 70/218, 231
See application file for complete search history.

(56) References Cited

U.S. PATENT DOCUMENTS

| | | | | |
|---|---|---|---|---|
| 1,358,681 A * | 11/1920 | Parker | ................... | 70/218 |
| 2,137,178 A * | 11/1938 | Merivaara | ................ | 108/136 |
| 3,351,321 A * | 11/1967 | Grams et al. | ................ | 254/420 |
| 3,647,243 A * | 3/1972 | Nagy et al. | ................ | 280/433 |
| 3,764,109 A * | 10/1973 | Hollis, Jr. | ................ | 254/420 |
| 4,697,444 A * | 10/1987 | Maffey | ................ | 70/232 |
| 5,136,863 A * | 8/1992 | Richardson | ................ | 70/14 |
| 5,426,961 A * | 6/1995 | Rimbaud et al. | ................ | 70/237 |
| 5,579,862 A * | 12/1996 | Bowden et al. | ................ | 180/287 |
| 5,782,115 A * | 7/1998 | Judy | ................ | 70/164 |
| 5,797,285 A * | 8/1998 | Sackowitz | ................ | 70/177 |
| 5,984,353 A * | 11/1999 | Rasmussen | ................ | 280/766.1 |
| 6,141,997 A * | 11/2000 | Blehi, III | ................ | 70/56 |
| 6,434,982 B1 * | 8/2002 | Rowland | ................ | 70/211 |
| 6,485,002 B1 * | 11/2002 | Goss | ................ | 254/420 |
| 6,568,226 B1 * | 5/2003 | Ramsauer | ................ | 70/127 |
| 6,705,137 B2 * | 3/2004 | Saladin et al. | ................ | 70/212 |
| 7,040,646 B2 * | 5/2006 | Pare | ................ | 280/507 |
| 7,303,210 B2 * | 12/2007 | Baxter et al. | ................ | 280/766.1 |
| 2007/0181864 A1 * | 8/2007 | Bartee | ................ | 254/424 |

* cited by examiner

*Primary Examiner*—Richard W L Ridley
*Assistant Examiner*—Matthew A Johnson
(74) *Attorney, Agent, or Firm*—Robert S. Salzman; Law Office of Robert S. Salzman

(57) ABSTRACT

A kit is described that modifies a standard screw jack for a trailer hitch, by introducing a safety lock mechanism. The modified screw jack will be inoperative until the safety lock mechanism is opened. In the inoperative position, the screw jack cannot be turned to lift or lower the trailer hitch. The crank for turning the screw jack will be freewheeling or frozen. Turning a key in a lock keyway will release the safety lock mechanism, thus putting the crank into rotational engagement with the screw jack.

6 Claims, 1 Drawing Sheet

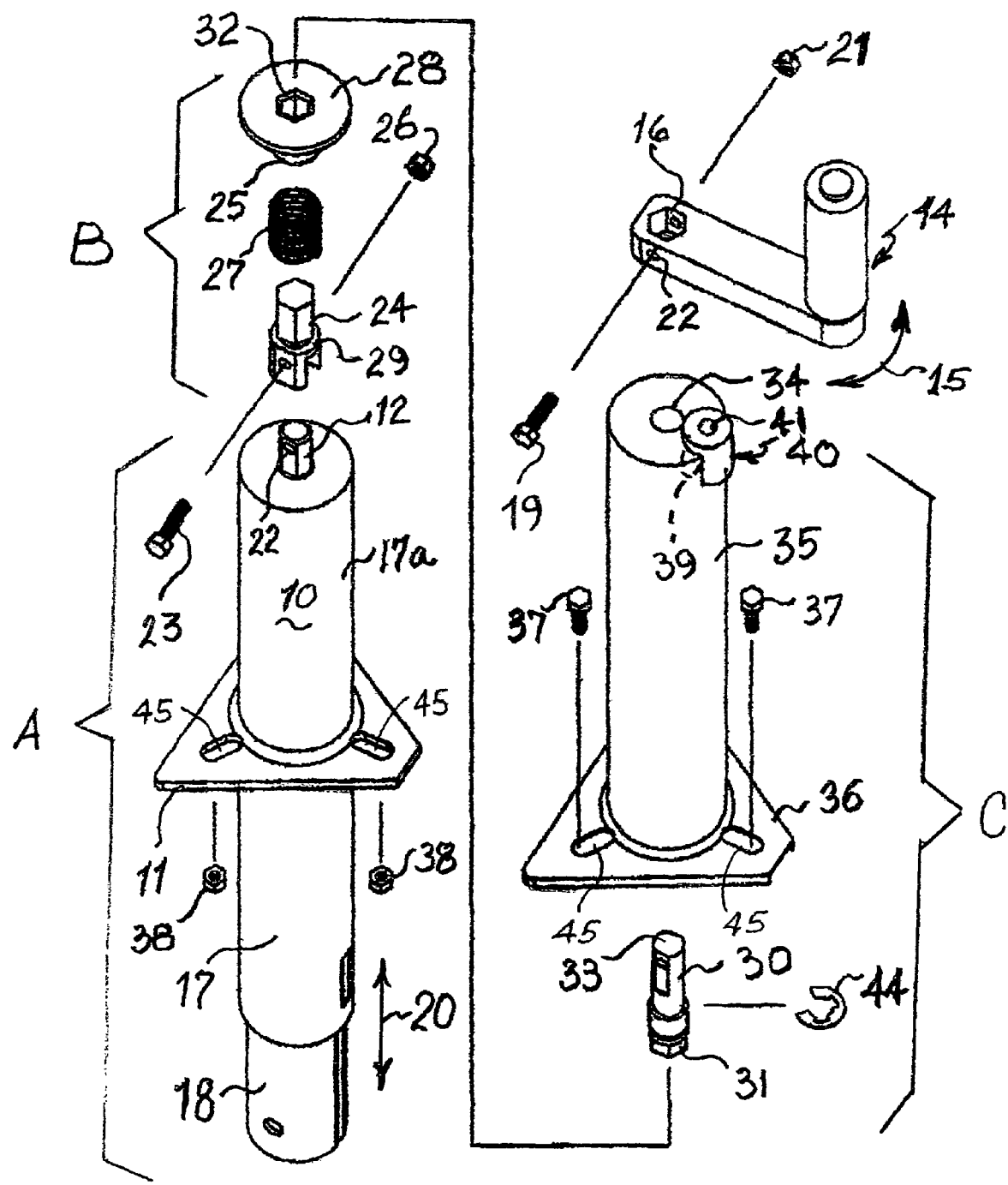
THE FIGURE

TRAILER JACK LOCK

FIELD OF THE INVENTION

The present invention relates to vehicle trailer jacks, and more particularly to a vehicle trailer jack comprising a locking mechanism that renders the vehicle trailer jack unusable by unauthorized personnel.

BACKGROUND OF THE INVENTION

Trailers have a triangular brace that carries a hitch. The triangular brace and hitch are usually raised off the ground, when the trailer is not in use. This provides the trailer hitch to remain free of corrosion, caused by the dampness of ground contact. Also, raising the triangular brace off the ground, allows the trailer cab to stay level. Objects stored in the cab will not shift, when the cab is so situated. A raised hitch is also in a ready position to be lowered onto a vehicle for transportation.

A jack is commercially available to raise the hitch to a desired level, either for attachment to a vehicle, or as a means to keep the trailer properly stored when not in use.

It is known that storing trailers upon their jack supports is often fraught with difficulties when trailers are not well guarded. It is known that thieves frequently steal these trailers, using the owner's own jack to hitch the trailer to their vehicle.

Standard trailer jacks comprise a two-part sleeve consisting of an inner sleeve, and an outer concentric sleeve that fits over the inner sleeve. The inner sleeve contains a screw jack. Turning the screw jack lifts, or lowers the outer concentric sleeve, which is operatively attached to the screw jack. The outer concentric sleeve fits snugly over the inner sleeve. The outer sleeve has a triangular mounting bracket attached at a mid-portion of its outer surface. The triangular mounting bracket contains three screw holes at each corner, for attaching the trailer hitch. It is an easy task to snap a wrench onto an upper fitting of the screw jack, and lower the mounting bracket to a level needed to hitch the trailer to a vehicle. This trailer jack design invites theft.

The present invention can be manufactured as original equipment, or as a kit for modifying existing trailer jacks.

The current invention as described herein as a kit, comprises an assembly that places a second outer sleeve over an outer sleeve of the screw jack. The second outer sleeve comprises a built-in lock. The lock receives a key that is inserted into a lock keyway. In a locking mode, the key that fits into a keyway of the lock causes a rod to extend downwardly from the top of the second sleeve, when the key is turned. An extension assembly that fits over the standard screw jack has a circular, spring-biased plate. The circular spring-biased plate has a hexagonal hole that supports a second, extended turnkey. The second, extended turnkey is accepted in the hexagonal hole of the turning crank that operates the screw jack. In the locking mode, the extended rod causes the circular spring-biased plate to disengage from the second, extended turnkey. Thus, the turning crank is rendered freely spinning and the trailer jack becomes inoperative. Only the owner of the trailer, who possesses the key for the lock, will be able to actuate, and operate the screw jack.

As original equipment, the trailer jack is sold with an outer sleeve containing a built-in lock and locking mechanism, and the internal extension mechanism with the circular spring-biased plate.

As an add-on, or modification of the standard trailer jack, the invention is sold as a kit. The kit features a second outer sleeve with a lock, and materials to form an internal extension of the turnkey. The extension fits upon the standard screw jack turnkey. The kit also provides the keys for the lock.

SUMMARY OF THE INVENTION

In accordance with the present invention, a vehicle trailer jack comprises a locking mechanism that renders the vehicle trailer jack unusable by unauthorized personnel. The jack includes an assembly that includes an outer sleeve with a built-in locking mechanism, and a key-way that receives a key to unlock the locking mechanism. In a locking position, the key that fits into a lock of the locking mechanism causes an internal rod to extend downwardly from the top of the outer sleeve. The rod comes into contact with a circular, spring-biased plate that is part of an extension assembly. The extension assembly fits over an internal screw jack turnkey. The circular plate has a hexagonal hole that accepts a second, extended turnkey. The second, extended turnkey is in turn accepted in a hexagonal hole of a turning crank. In an unlocked, operative position, the rotation of the turning crank operates the screw jack by virtue of its turning the second, turnkey extension. However, in the locked position, the displaced circular plate is forced downwardly against its biasing by the extended rod. In this position, the spring-biased plate is disengaged from contact with the second turnkey, thus causing the trailer jack to become inoperative. Releasing the lock will disengage the rod from the circular plate, allowing the circular plate to move under its biasing to an operative position that will accept the second, extended turnkey, and allow the crank to operate the screw jack.

In the inoperative position, the turning crank is rendered freely spinning and the trailer jack is inoperative. Only the owner of the trailer, who possesses the key for the lock, will be able to unlock, and operate the screw jack.

As original equipment, the trailer jack is sold with an outer sleeve containing the locking mechanism, and the internal extension mechanism with the spring-biased plate.

As an add-on or modification for the trailer jack, the invention is sold as a kit featuring an external sleeve with a built-in lock that fits over the standard outer sleeve. The kit also provides the internal extension assembly, circular plate, and a pair of keys for the lock.

It is an object of this invention to provide a means for disengaging the drive of a trailer jack, in order to discourage theft of the trailer.

It is another object of the invention to provide a locking mechanism for a trailer jack that will prevent the screw jack from being cranked.

It is a further object of the present invention to provide an improved trailer jack that will discourage theft.

BRIEF DESCRIPTION OF THE DRAWINGS

A complete understanding of the present invention may be obtained by reference to the accompanying drawing, when considered in conjunction with the subsequent detailed description, in which:

The FIGURE illustrates an exploded perspective view of a kit assembly modifying a standard trailer jack so that it can only operate when a built-in lock in a second, outer sleeve is opened.

DESCRIPTION OF THE PREFERRED EMBODIMENT

Generally speaking, a kit is described that modifies a standard screw jack for a trailer hitch by introducing a safety lock mechanism. The modified screw jack will be inoperative until the safety lock mechanism is opened. In the inoperative position, the screw jack cannot be turned to lift or lower the trailer hitch. The crank for turning the screw jack will be freewheeling or frozen. Turning a key in a lock keyway will release the safety lock mechanism, thus putting the crank into rotational engagement with the screw jack.

Now referring to the FIGURE, a standard screw jack 10 is shown within bracket "A". A triangular mounting bracket 11 disposed at a mid-section of the screw jack 10, receives a trailer hitch (not shown). Turnkey 12 at the top of the screw jack 10 is hexagonally shaped to fit the hexagonal hole 16 of the crank 14. The trailer hitch can be moved up or down by rotating the turnkey 12 with crank 14, as shown by arrows 15.

The screw jack 10 as constructed in bracket "A" has an internal screw-worm (not shown) that raises or lowers outer sleeve 17 from inner sleeve 18 upon which it slides, as shown by arrows 20.

The turnkey 12 can be secured to crank 14 by means of a screw 19 and nut 21, which fits through hole 22, which passes through turnkey 12 and crank 14, as illustrated.

The kit of this invention is illustrated by the elements shown in brackets "B" and "C", respectively. The elements of bracket "B" consist of a hexagonal extension piece 24 that is secured to the turnkey 12 by bolt 23 and nut 26, respectively. A coil spring 27 fits over the hexagonal extension piece 24. A top portion of coil spring 27 is captured in the hollow cylindrical portion 25 of the circular plate 28, along with a top portion of the hexagonal extension piece 24. The bottom of coil spring 27 rests upon lip 29 of the hexagonal extension piece 24.

A second hexagonal turnkey extension 30 (see bracket elements "C") has its hexagonal-shaped bottom portion 31 fit into the hexagonal hole 32 of the circular plate 28 (see bracket "B"). Its top hexagonal-shaped portion 33 projects through hole 34 in the second outer sleeve 35. Sleeve 35 fits over upper portion 17a of the screw jack 10. The triangular bracket 36 attached to sleeve 35 mounts to the triangular bracket 11 by means of bolts and nuts 37 and 38, respectively, which pass through mounting holes 45, as shown.

The second outer sleeve 35 has a locking mechanism 40 disposed on its side, as shown. The locking mechanism 40 comprises a lock and keyway 41 and an internal cam rod 39 shown in phantom. Cam rod 39 is caused to impinge upon the circular plate 28 when, the locking mechanism is locked by an external key (not shown). The external key is inserted into the keyway 41, and turns the lock of the locking mechanism 40 so that cam rod 39 forces circular plate 28 downwardly against its coil spring 27. In so doing, the circular plate 28 disengages from the second hexagonal turnkey extension 30 at hexagonal hole 32.

A locking ring 44 holds the turnkey extension 30 in position, so that it will align with hexagonal hole 32, when the locking mechanism is released, as when the external key (not shown) is reinserted into keyway 41 and turned to an open position.

The hexagonal top portion 33 of the turnkey extension 30 fits into the hexagonal hole 16 of crank 14. In the operative position, the crank 14 will be able to operate the screw jack via the second turnkey extension 30.

It should be realized by practitioners of this art, that the disengagement afforded by the cam rod 39, could equally as well be converted to a locking of the circular plate 28 by the insertion of the cam rod 39 through a slot (not shown) in the circular plate 28. Either locking or disengaging the circular plate 28 will work equally as well in preventing operation of the screw jack 10.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired for protection by Letters Patent is presented in the subsequently appended claims.

What is claimed is:

1. A screw jack for a trailer hitch comprising a turnkey that can be cranked to raise and lower said screw jack, said turnkey operatively connected to said screw jack, and rotating said screw jack in an operative position, and a locking mechanism operatively connected to said turnkey, said locking mechanism preventing said turnkey from rotating said screw jack when said locking mechanism is in a locked position, and for allowing said turnkey to rotate said screw jack when said locking mechanism is in an unlocked positions, and wherein said locking mechanism comprises a lock, a cam, and a spring-biased plate connected to said screw jack, said cam being operatively connected to said lock, and operatively connected to said spring biased plate, said cam disengaging said turnkey by forcing said spring biased plate to move out of contact with said turnkey.

2. The screw jack in accordance with claim 1, wherein said turnkey is freewheeling when said locking mechanism is in said locked position.

3. The screw jack in accordance with claim 1, further comprising an outer sleeve for supporting said lock, said outer sleeve fitting over said screw jack.

4. A screw jack for a trailer hitch comprising a turnkey that can be cranked to raise and lower said screw jack, said turnkey operatively connected to said screw jack, and rotating said screw jack in an operative position, and a locking mechanism operatively connected to said turnkey, said locking mechanism being key operated and causing said turnkey to disengage from said screw jack, in a locked position, and causing said turnkey to engage said screw jack in an unlocked position, in order to rotate said screw jack, and wherein said locking mechanism comprises a lock, a cam, and a spring-biased plate, said cam being operatively connected to said lock, and operatively connected to said spring biased plate, said cam disengaging said turnkey by forcing said spring biased plate to move out of contact with said turnkey, when said locking mechanism is in a locked position.

5. The screw jack in accordance with claim 4, wherein said turnkey is freewheeling when said locking mechanism is in said locked position.

6. The screw jack in accordance with claim 4, further comprising an outer sleeve for supporting said lock, said outer sleeve fitting over said screw jack.

* * * * *